United States Patent [19]
Bombeeck

[11] Patent Number: 5,335,121
[45] Date of Patent: Aug. 2, 1994

[54] ARRANGEMENT FOR REPRODUCING A DIGITAL SIGNAL FROM A TRACK ON A MAGNETIC RECORD CARRIER USING A READ HEAD WITH MAGNETO-RESISTIVE ELEMENT AND AN EQUALIZER FILTER

[75] Inventor: John M. Bombeeck, Eindhoven, Netherlands

[73] Assignee: U.S. Philips Corporation, New York, N.Y.

[21] Appl. No.: 142,647

[22] Filed: Oct. 25, 1993

Related U.S. Application Data

[63] Continuation of Ser. No. 838,385, Feb. 19, 1992.

[30] Foreign Application Priority Data

Oct. 1, 1991 [EP] European Pat. Off. ........ 91202549.1

[51] Int. Cl.$^5$ ..................... G11B 5/035; G11B 5/127; G11B 5/33
[52] U.S. Cl. ..................................... 360/65; 360/113
[58] Field of Search ................. 360/65, 67, 113, 126, 360/128; 364/724.16, 724.17

[56] References Cited

U.S. PATENT DOCUMENTS

| | | | |
|---|---|---|---|
| 3,975,772 | 8/1976 | Lin | 360/113 |
| 4,011,585 | 3/1977 | Sunaga | 360/65 |
| 4,314,288 | 2/1982 | Gyi | 360/67 |
| 4,928,287 | 5/1990 | Tanaka | 360/65 |
| 5,181,149 | 1/1993 | Katsumata et al. | 360/113 |

OTHER PUBLICATIONS

T. Carr et al., "A 107-kb PI, 16-um Track Width Recording Channel", IEEE Transactions on Magnetics, vol. 24, No. 6, Nov. 1988, pp. 2961-2962.

M. R. Campbell et al., "An Algorithmic Procedure for Designing Hybrid FIR/IIR Digital Filters", Bell System Technical Journal, vol. 55, No. 1, Jan. 1976 pp. 89-108.

Primary Examiner—Donald Hajec
Assistant Examiner—T. N. Forbus, Jr.
Attorney, Agent, or Firm—Edward W. Goodman

[57] ABSTRACT

An arrangement for reproducing a digital signal from a track on a magnetic record carrier (20) includes a magnetic read head (21) having a magneto resistive element (107), and an equalizer filter circuit (23) for equalizing the output signal of the read head. The equalizer filter circuit (23) includes an IIR filter (29) and FIR (30). The IIR filter (29) equalizes magnitude and group delay of the signal applied to its input in a low frequency region of the signal frequency range. The FIR filter equalizes at least the magnitude of the signal applied to its input in a higher frequency region of the signal frequency range. Viewed in the direction of transport of the record carrier, the MR head has a front side and a back side. One of the sides (41) has a magnetic shielding for the MR element (107) which is larger than the magnetic shielding of the other side (40). The MR head (21) is positioned relative to the track so that the front side (40) has the lesser magnetic shielding.

4 Claims, 2 Drawing Sheets

ARRANGEMENT FOR REPRODUCING A DIGITAL SIGNAL FROM A TRACK ON A MAGNETIC RECORD CARRIER USING A READ HEAD WITH MAGNETO-RESISTIVE ELEMENT AND AN EQUALIZER FILTER

This is a continuation of application Ser. No. 07/838,385, filed on Feb. 19, 1992.

BACKGROUND OF THE INVENTION

1. Field of the Invention

The invention relates to an arrangement for reproducing a digital signal from a track on a magnetic record carder, the arrangement including

- a magnetic read head having a magneto resistive (MR) element, and wherein, viewed in the direction of transport of the track relative to the head, the magnetic head has a first side (front) and a second side (back), one of the sides having a magnetic shielding for the MR element which is larger than the magnetic shielding on the other side,
- an equalizer filter means, having an input coupled to an output of the magnetic read head, and an output, the equalizer filter means being adapted to supply an output signal at its output which has been substantially equalized as regards magnitude and group delay as a function of frequency, the equalizer filter means including finite impulse response (FIR) filter means, and
- transport means for moving the track in a certain direction past the magnetic read head.

2. Description of the Related Art

Thin film heads of the MRH type as described in the foregoing have been disclosed in the Journal '*Electrotechnology*', April 1988, pages 61 to 64. When used in an arrangement for reproducing a digital signal from a track on a magnetic record carrier, an equalizer filter means is needed so as to compensate for the non-flat frequency characteristic of the reproducing system. The frequency characteristic of a system is expressed as a magnitude response and a phase response of the system as a function of frequency. The group delay of the system has a relation to the phase response of the system in that the group delay is proportional to the first derivative with respect to frequency of the phase response, or $D(f) \doteq \delta \Phi(f)/\delta f$, where D is the group delay of the system as a function of frequency and $\Phi$ is the phase response of the system as a function of frequency.

It is known to use a FIR filter in the equalizer filter means. FIR filters are also called transversal filters, and are well known in the art of digital filter technology.

Prior art reproducing arrangements have the disadvantage that the equalizer filter means becomes very complex in that a large number of coefficients are needed in the FIR filter means in order to sufficiently equalize the signal read from the track. Such filter means realized in the form of an integrated circuit results in a large surface area of the substrate of the IC being occupied. Attempts to decrease the complexity of the equalizer filter means have led to a deterioration after equalization of the signal read from the tape.

SUMMARY OF THE INVENTION

The invention aims at providing a reproducing arrangement having a reduced complexity in the equalizer filter means, this arrangement being capable of supplying an equalized output signal of acceptable signal quality.

For that purpose, the arrangement is characterized in that the equalizer filter means further includes infinite impulse response (IIR) filter means, the IIR filter means being adapted to substantially equalize magnitude and delay of the signal applied to its input in a low frequency region of the signal frequency range as a function of frequency, the FIR filter means being adapted to substantially equalize at least the magnitude of the signal applied to its input in a higher frequency region of the signal frequency range, as a function of frequency, and in that the first side (front) of the magnetic head is the side having the lesser magnetic shielding for the MR element.

The invention is based on the following recognition. The detection by the magnetic head of a bit recorded in the track ideally leads to a pulse signal with a certain polarity in the output signal of the head. In prior art reproducing systems the magnetic read head is often positioned relative to the track on the record carrier so that the second side (back) of the magnetic head is the side having the lesser magnetic shielding for the MR element. As a consequence this leads to a post-pulse signal component having an inverse polarity in the output signal of the magnetic head, which results in an increase of the group delay towards lower frequencies in a low frequency region of the total frequency range.

Splitting up the equalizer filter means into two filter sections in the form of an IIR filter means and a FIR filter means opens the possibility of realizing the equalization only in the high frequency region of the signal frequency range by means of the FIR filter means and only the low frequency equalization by means of the IIR filter means.

IIR filters are also called recursive filters, and incorporate a feedback so as to feed a delayed output signal of the filter back to an input of the filter. Therefore, a limited number of coefficients suffice in the IIR filter to realize the low frequency equalization. Further, because of the fact that the FIR filter equalization is only restricted to the high frequency region, only a limited number of coefficients are needed in the FIR filter. As a result the complexity and size of the equalizer filter means is reduced significantly.

Response equalization in the low frequency region as regards the delay as a function of frequency means that the IIR must exhibit a delay as a function of frequency which decreases towards lower frequencies. Attempts to realize such IIR filters, which filters are also capable of realizing the required magnitude equalization in said low frequency region, have resulted in filters which are inherently unstable.

However, rotating the magnetic head through 180° with respect to an axis perpendicular to the track surface means that the first side (front) of the magnetic head is the side having the lesser magnetic shielding for the MR element. As a consequence, this leads to a pre-pulse signal component with an inverse polarity in the output signal of the magnetic head, which results in a decrease of the group delay towards lower frequencies in the low frequency region of the total frequency range. In this situation the IIR filter must exhibit a group delay as a function of frequency which increases towards lower frequencies. Such IIR filters, that can also realize the required magnitude equalization in the low frequency region, are inherently stable and easy to realize.

As a result, an arrangement for reproducing a digital signal from a track on a magnetic record carrier, including a magnetic read head having a magneto resistive (MR) element, has been realized with equalizer filter means of reduced complexity, the magnitude and group delay of the output signal having been equalized as a function of frequency with an acceptable quality.

BRIEF DESCRIPTION OF THE DRAWINGS

These and other aspects of the invention will be apparent from and further explained with reference to the embodiments described in the following description of the figures, in which.

DESCRIPTION OF THE PREFERRED EMBODIMENT

Figure 1:
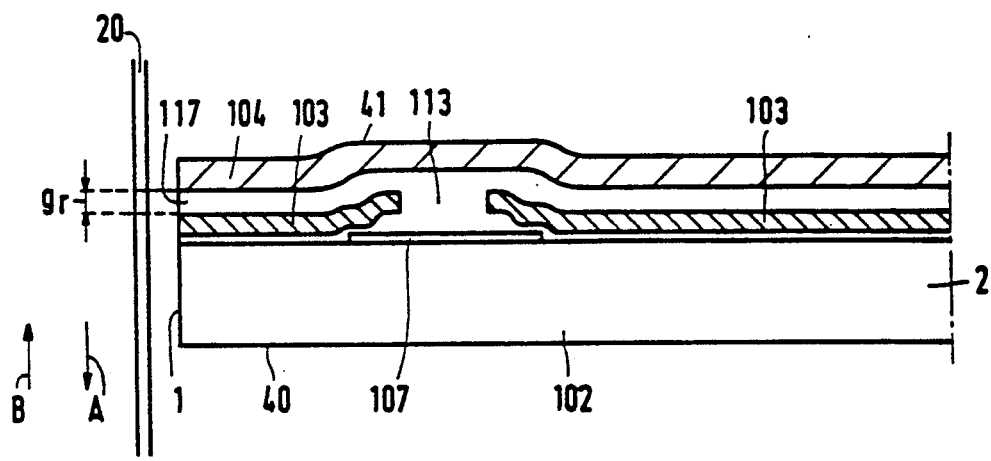
FIG. 1 shows a cross-sectional view of a magnetic read head of the MRH type.

FIG. 1 discloses an example of a thin film magnetic read head of the MRH type. The head has a face 1 which cooperates with the track on a magnetic record carder 20, such as a magnetic tape. FIG. 1 shows a cross-sectional view of a plane intersecting the head and the track, which plane runs perpendicular to the face and in the length of the track. The magnetic head has a substrate 2 of a non-magnetic material on which a magneto resistive (MR) element 107, a first magnetic flux conductor 103 and a second magnetic flux conductor 104 are deposited. The magnetic flux conductors 103 and 104 form a read gap 117 having a gap width of $g_r$. In order to function as a read head, a DC current is applied to the MR element 107. The current runs in a direction perpendicular to the face of the drawing through the MR element 107.

The electrically and/or magnetically conductive layers in the read head are separated by a material 113 having an appropriately isolating behavior.

Magnetization variations in the track detected by the head when the record carrier 20 is transported past the head in either direction A or B lead to variations in the magnetic flux passing through the magnetic circuit of the head which are formed by the flux conductors 103 and 104 and the MR element 107. Those magnetic flux variations lead to a variation in the electric resistance of the MR element 107 and, consequently, to variations in the voltage across the element. Those voltage variations present at the output of the element represent the magnetization variations in the track.

Figure 2:
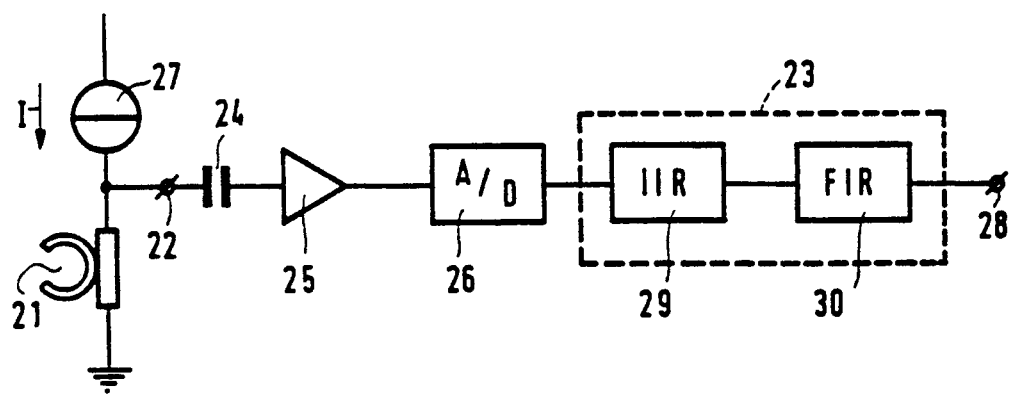
FIG. 2 shows an embodiment of the arrangement.

FIG. 2 shows an embodiment of the reproducing arrangement comprising the read head 21 of the MRH type, an output 22 of which is coupled to an input of equalizer filter means 23 via a coupling capacitor 24, a preamplifier 25 and an analog-to-digital converter 26. The direct source 27 supplies the DC current to the MR element 107 of the head 21. An equalized output signal will be available at the output 28 of the arrangement.

In order to equalize the magnitude and group delay of the response of the read head 21 as a function of frequency, it is known to provide the equalizer filter means 23 with a FIR filter. Such a FIR filter however, needs a large number of coefficients and thus taps for equalizing the response of the read head over the total signal frequency range. More specifically, the equalization in the low frequency region of the total signal frequency range require a long impulse response of the filter and thus a large number of coefficients. A realistic length of the required response of the filter is e.g. 150 bits. With a sample rate of 1 sample per bit, this means that the number of coefficients needed in this case is equal to 150. This makes the FIR filter complex and expensive.

In the embodiment of FIG. 2 the equalizer filter means 23 comprises an IIR filter 29 and a FIR filter 30. The equalization of the total signal frequency range is now divided into an equalization for the low frequency region of the total signal frequency range, which will be carried out by the IIR filter 29, and an equalization for the high frequency region of the total signal frequency range, which will be realized by the FIR filter 30.

The equalization for the high frequency region can be realized relatively simply by means of a simple FIR filter with a reduced number of coefficients (taps). For example, only 4 coefficients suffice, which is a great reduction compared to the 150 coefficients of the original FIR filter.

The IIR filter, though having a limited number of coefficients, has, as the name already says, an impulse response of infinite length, because of the feedback included in the filter. This makes even an IIR filter with a low number of coefficients useful for equalization in the low frequency region of the total signal frequency range. For example, only 6 coefficients suffice for realizing a 2nd order IIR filter, that is, 3 coefficients for the numerator and 3 coefficients for the denominator.

In conclusion it may thus be stated that the complexity of the equalizer filter means 23 has been reduced significantly.

What follows is a discussion of the behavior of the group delay of the read head plotted against frequency, specifically the behavior of the group delay in the low frequency region of the total signal frequency range, and a discussion of the equalization of this group delay.

Figure 3A:
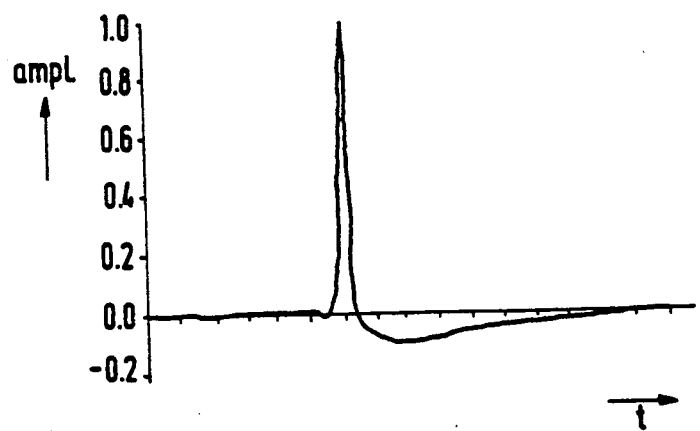
FIG. 3 shows in FIG. 3a the output signal of the head plotted against time in response to a reversal in the magnetization direction in the track that is transported past the head in a certain direction, and FIG. 3b the group delay of the head plotted against frequency.

FIG. 3a shows the output signal of the read head plotted against time resulting from two subsequent reversals of the direction of magnetization forming a bit in the track, when the track is transported past the head in the direction A of FIG. 1, which is the normal direction of transport during read-out of the track. The output signal exhibits an impulse having a certain polarity and a certain peak value, the latter being normalized to 1.0 in the example of FIG. 3a. The impulse is followed by a post-pulse signal component of reverse polarity. The occurrence of this post-pulse signal component can be explained as follows.

The magnetization transitions in the track that approach the gap 117 in the direction A are detected by the MR element 107 when the magnetization transitions directly face the gap 117. Prior thereto, the detection of the magnetization transitions by the MR element 107 is more or less impossible because the magnetic shielding property of the flux conductor 104 prevents the magnetic field caused by the magnetization transitions to reach the MR element 107.

When the magnetization transitions in the track have passed the gap 117, the magnetic field caused by the magnetization transitions is still capable of reaching the MR element 107, because of the fact that the substrate is of a non-magnetic material, so that it cannot prevent the magnetic field from reaching the MR element 107. This results in the post-pulse signal component shown in FIG. 3a.

Figure 3B:
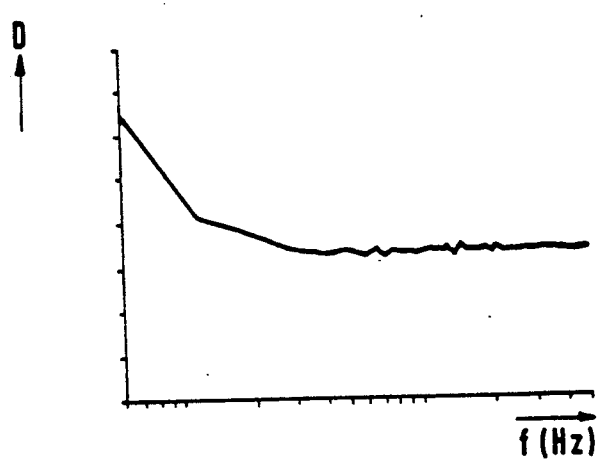

FIG. 3b shows the group delay D of the head plotted against frequency f. The frequency is plotted on a logarithmic scale along the horizontal axis. The curve for the group delay D exhibits an increase towards lower frequencies in the lower frequency region of the frequency range plotted in FIG. 3b. The post-pulse signal component shown in FIG. 3a is the reason for this increase of the group delay D for lower frequencies.

The IIR filter 29 should exhibit a transfer characteristic as a function of frequency such that it also equalizes the non-flat group delay characteristic of the head. Therefore, the filter 29 should realize a group delay characteristic which exhibits a decrease towards lower frequencies which is complementary to the increase in the group delay characteristic of FIG. 3b, so that the overall group delay of the head and the filter as a function of frequency is constant.

IIR filters capable of equalizing the magnitude response of this read head as a function of frequency in general have a group delay characteristic with an increase towards lower frequencies in the lower frequency region. Such IIR filters cannot be used for equalizing the head, because such filters magnify the increase in group delay towards lower frequencies, resulting in highly distorted output signals at the output 28 of the arrangement.

Figure 4A:
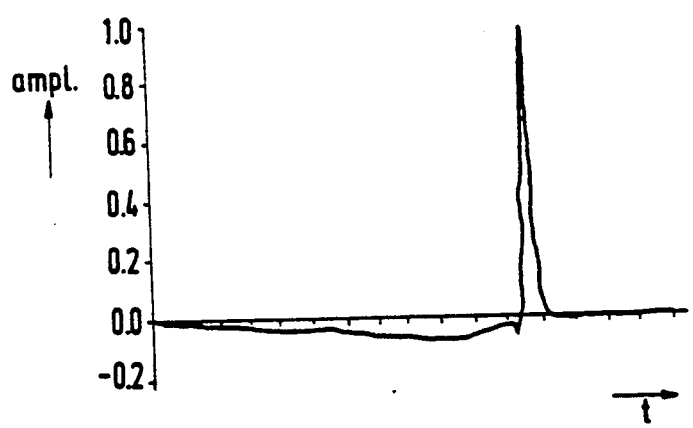
FIG. 4 shows in FIG. 4a the output signal of the head in response to that same transition in magnetization, the direction of transport being the reverse direction, and FIG. 4b the group delay of the head plotted against frequency.

Rotating the read head 180° around an axis lying in the plane of the drawing of FIG. 1 and being perpendicular to the track, results in an output signal as shown in FIG. 4a. Rotating the head in FIG. 1 is the same as reversing the direction of tape transport A to the direction of B in FIG. 1. The output signal exhibits an impulse having a certain polarity and a certain peak value, the latter being normalized to 1.0 in the example of FIG. 4a. The impulse is preceded by a pre-pulse signal component of reverse polarity. The occurrence of this pre-pulse signal component can be explained as follows.

The magnetization transitions in the track which approach the gap 117 in the direction of B are detected by the MR element 107 when the magnetization transitions directly face the gap 117. This results in the impulse in FIG. 4a. Prior thereto, when the transitions approach the head, the magnetic field caused by the magnetization transitions is already capable of reaching the MR element 107, because of the fact that the substrate is of a non-magnetic material. Therefore, it cannot prevent the magnetic field from reaching the MR element 107. This results in the pre-pulse signal component shown in FIG. 4a. When the magnetization transitions in the track have passed the gap 117, the flux conductor 104 prevents the magnetic field caused by the magnetization transitions from reaching the MR element 107, because of the magnetic shielding property of the conductor 107.

Figure 4B:
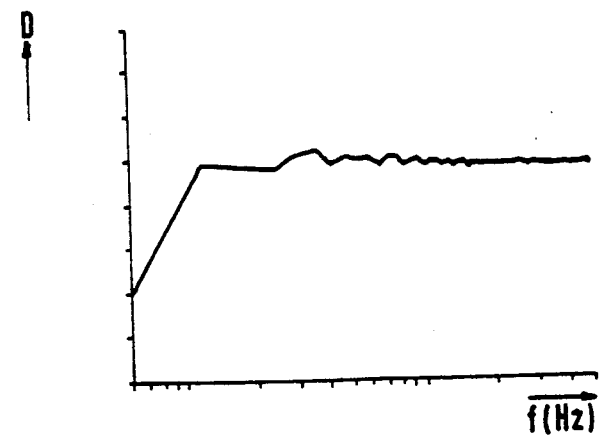

FIG. 4b shows the group delay D of the head plotted against frequency f. The frequency is plotted on a logarithmic scale along the horizontal axis. The curve for the group delay D exhibits a decrease towards lower frequencies in the lower frequency region of the frequency range plotted in FIG. 4b. The pre-pulse signal component shown in FIG. 4a is the reason for this decrease of the group delay D for lower frequencies.

The head as rotated in accordance with FIG. 4 together with the IIR filter discussed above, now have group delay characteristics which are complementary to each other, so that an equalization of the decreasing group delay of the head can be easily compensated for by the IIR filter having an increasing group delay towards lower frequencies in the lower frequency region of the total frequency range.

As a result an arrangement is obtained in which the direction of transport of the tape past the head is in the direction of B, see FIG. 1. That is: the direction of transport of the track relative to the head is in a direction from the side 40 of the head having the lower magnetic shielding capacity for magnetic fields towards the side 41 of the head having the higher magnetic shielding capacity for magnetic fields. Furthermore, the equalizer means 23, comprising an IIR filter 29 and an FIR filter 30, is of a simple construction and can easily be integrated. The IIR filter 29 is adapted to substantially equalize the magnitude and group delay A the response of the head as a function of frequency in the lower frequency region. The FIR filter 30 is adapted to substantially equalize the response of the head in the higher frequency region.

It is to be noted that the invention is not limited to the embodiment disclosed in the present descriptions of the figures. The invention equally applies to those embodiments which differ from the embodiment shown in aspects which are not relevant to the invention.

In this respect it is to be noted that it is possible to incorporate in one of the filters 29 or 30 a block for a DC component present in the input signal of that filter, in order to realize a DC free output signal at the output 28.

Although a capacitor 24 is present in the arrangement, DC components may occur in the signal applied to the inputs of the filters 29 and 30, because of offset errors in the amplifier 25 or quantization errors in the AD converter 26.

A block for DC components can be realized very easily in the FIR filter 30 by adding one more coefficient. This one coefficient can be chosen such that together with the other coefficients the output signal of the filter 30 has a zero DC component. If, however, the DC block is incorporated in the IIR filter 29, and the IIR filter 29 is connected in series with and prior to the FIR filter in the series connection, this means that a DC-free signal is applied to the FIR filter 30. This has the advantage that the total existing amplitude range in the FIR filter can be used for the equalization, or that a smaller amplitude range can be used in the FIR filter, leading to an even simpler FIR filter.

I claim:

1. Arrangement for reproducing a digital signal from a track on a magnetic record carrier, the arrangement including:

a magnetic read head having a magneto-resistive (MR) element, the magnetic head having a first side (front) and a second side (back), one of the sides having a magnetic shielding for the MR element which is larger than the magnetic shielding on the other side, whereby the MR element is substantially unshielded against external magnetic fields on said first side of the magnetic read head, and is substantially shielded against external magnetic fields, other than a reproducing magnetic field, on said second side of the magnetic read head;

an equalizer filter means, having an input coupled to an output of the magnetic read head, and an output, the equalizer filter means being adapted to supply an output signal at its output which has been substantially equalized as regards magnitude and group delay as a function of frequency; and transport means for moving the magnetic record carrier in a certain direction past the magnetic read head, characterized in that the equalizer filter means includes a series arrangement of digital finite impulse response (FIR) filter means and digital infinite impulse response (IIR) filter means, the IIR filter means having an input an output, and being adapted to substantially equalize magnitude and delay of signal applied to its input in a low frequency region of the signal frequency range as a function of frequency, and to supply an equalized signal to its output, and the FIR filter means having an input and an output, and being adapted to substantially equalize the magnitude of a signal applied to its input in a higher frequency region of the signal frequency range as a function of frequency, and to supply an equalized signal to its output, and the transport means being adapted to transport the magnetic record carrier past the magnetic read head in a direction from the substantially unshielded first side to the substantially shielded second side.

2. Arrangement as claimed in claim 1, characterized in that, the FIR filter means is further adapted to substantially equalize the group delay of the signal in the higher frequency region as a function of frequency.

3. Arrangement as claimed in claim 1, characterized in that the IIR filter means is arranged prior to the FIR filter means in the equalizer filter means.

4. Arrangement as claimed in claim 2, characterized in that the IIR filter means is arranged prior to the FIR filter means in the equalizer filter means.

* * * * *